G. A. MARSH & H. H. THOMPSON.
FIRELESS COOKER.
APPLICATION FILED MAY 3, 1909.

930,204.

Patented Aug. 3, 1909.

Witnesses

Inventors
G. A. Marsh
H. H. Thompson
by Howard A. Coombs
Attorney

UNITED STATES PATENT OFFICE.

GEORGE A. MARSH, OF MARSHVILLE, NORTH CAROLINA, AND HIRAM H. THOMPSON, OF WASHINGTON, DISTRICT OF COLUMBIA.

FIRELESS COOKER.

No. 930,204.

Specification of Letters Patent.

Patented Aug. 3, 1909.

Application filed May 3, 1909. Serial No. 493,491.

*To all whom it may concern:*

Be it known that we, GEORGE A. MARSH and HIRAM H. THOMPSON, citizens of the United States of America, and residents of Marshville, North Carolina, and Washington, District of Columbia, respectively, have invented certain new and useful Improvements in Fireless Cookers, of which the following is a specification.

Our invention relates to a cooking apparatus and consists, more specifically stated, in certain improvements in those devices which are known as fireless cookers, which, as is generally known, are receptacles provided with non-conducting walls and adapted to contain food in its inner portions and maintain the same hot through a long period of time.

The object of our invention is to provide a device of this character which will be extremely efficient to obtain the desired purpose of maintaining the food hot.

Figure 1:
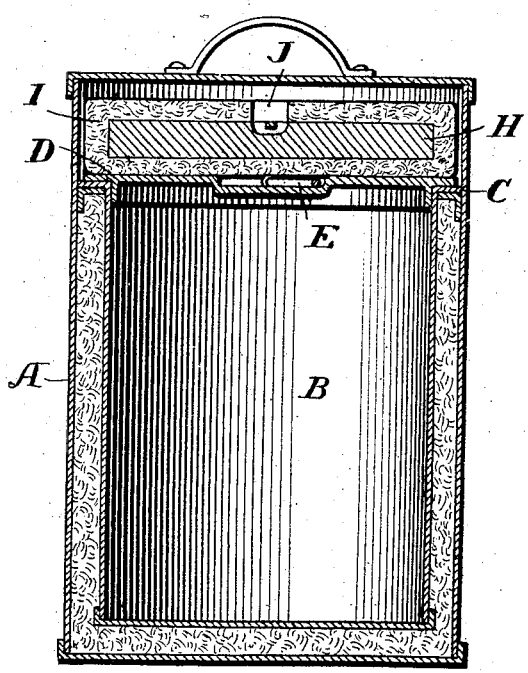
Figure 2:
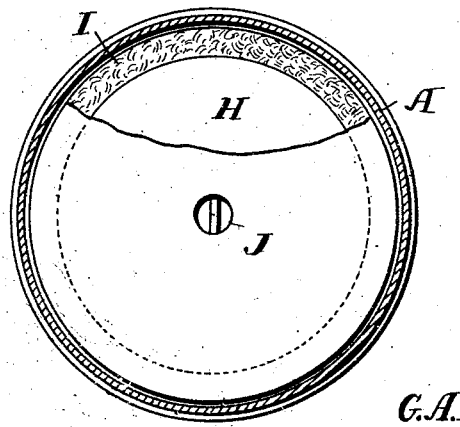

In the accompanying drawings: Figure 1 is a vertical section of our improved receptacle; and Fig. 2 is a plan of the same with the outer cover removed.

The body of the vessel does not differ materially from fireless cookers as heretofore constructed, that is to say, it consists of an outer casing A, and an inner receptacle B, the space between the walls of said casing and receptacle being filled with any suitable non-heat-conducting material, such as hair-felt, saw-dust, or the like. The vessel B is supported by the flange C, projecting inwardly from the wall of the outer casing and is intended to remain permanently within the said casing. It is also provided with a flat cover D, which has a handle E, whereby it may be lifted off, the handle being preferably pivoted to the cover so that it can be folded down flat.

Between the top of the vessel B and the top of the casing A, we leave a space to form an air chamber, and in this space is adapted to be placed a device for assisting in maintaining the temperature of the articles of food, which have first been subjected to heat until the boiling point is reached, and are then placed within the vessel B. The said device consists of a cast iron plate H surrounded by a covering of asbestos I, fitting closely in the casing A, the said covering having an opening J at the top through which an implement, such as an ordinary stove lifter can be inserted to lift the device out or to put in place. A space of about ½ inch is left above the plate. In practice this asbestos-covered plate is heated to a high temperature on a stove or the like and then, after the food to be further cooked has been placed in the vessel B, the hot asbestos-covered plate is laid on top of the cover of said vessel and then the outer cover is put on the casing A. By this means not only is the heat of the food prevented from escaping but the temperature thereof is kept substantially constant or may even increase for a time, the air chamber containing the hot plate forming an excellent non-conductor for preventing loss of heat through the covers, and also furnishing a source of heat to assist in cooking the food.

Having thus described our invention, what we claim is:

A fireless cooker comprising an outer casing and an inner vessel, non-heat conducting material between the walls thereof, said casing and vessel being provided with removable flat covers, the dimensions being such that an air-chamber is left between said covers, and a metal plate covered with asbestos adapted to be placed in said air-chamber while hot.

G. A. MARSH.
HIRAM H. THOMPSON.

Witnesses to the signature of G. A. Marsh:
S. D. MILLER,
J. JAS. ROBERTS.

Witnesses to the signature of Hiram H. Thompson:
E. BENNETT,
M. A. SEARLES.